United States Patent [19]
Schwartz

[11] Patent Number: 5,982,852
[45] Date of Patent: Nov. 9, 1999

[54] LINE PERFORMANCE TEST SYSTEM

[75] Inventor: Daniel J. Schwartz, Lindenhurst, Ill.

[73] Assignee: 3Com Corporation, Santa Clara, Calif.

[21] Appl. No.: 09/016,135

[22] Filed: Jan. 30, 1998

Related U.S. Application Data

[60] Provisional application No. 60/036,634, Jan. 31, 1997.

[51] Int. Cl.[6] .................................................. H04M 1/24
[52] U.S. Cl. .................................. 379/29; 379/1; 379/27
[58] Field of Search .................................. 379/1, 5, 6, 2, 379/27, 28, 29, 30, 32

[56] References Cited

U.S. PATENT DOCUMENTS

| | | | |
|---|---|---|---|
| 5,402,073 | 3/1995 | Ross | 379/29 |
| 5,471,517 | 11/1995 | Nakagawa | 379/29 |
| 5,799,060 | 8/1998 | Kennedy et al. | 379/29 |
| 5,875,229 | 2/1999 | Eyuboglu et al. | 379/1 |

*Primary Examiner*—Paul Loomis
*Attorney, Agent, or Firm*—McDonnell Boehnen Hulbert & Berghoff

[57] ABSTRACT

Apparatus for interconnecting the analog subscriber loops of two devices, such as central office equipment and/or central office emulators. The apparatus that is capable of switching a second central office emulator into a series connection between a first central office emulator and a subscriber unit. The apparatus includes a controller circuit for automatically performing the above-described switching. The apparatus also includes an off-hook detector circuit for providing the control circuit with an indication of the off-hook status of an analog subscriber unit. The device provides a solution to the disadvantages associated with the telecommunications test equipment presently available.

12 Claims, 4 Drawing Sheets

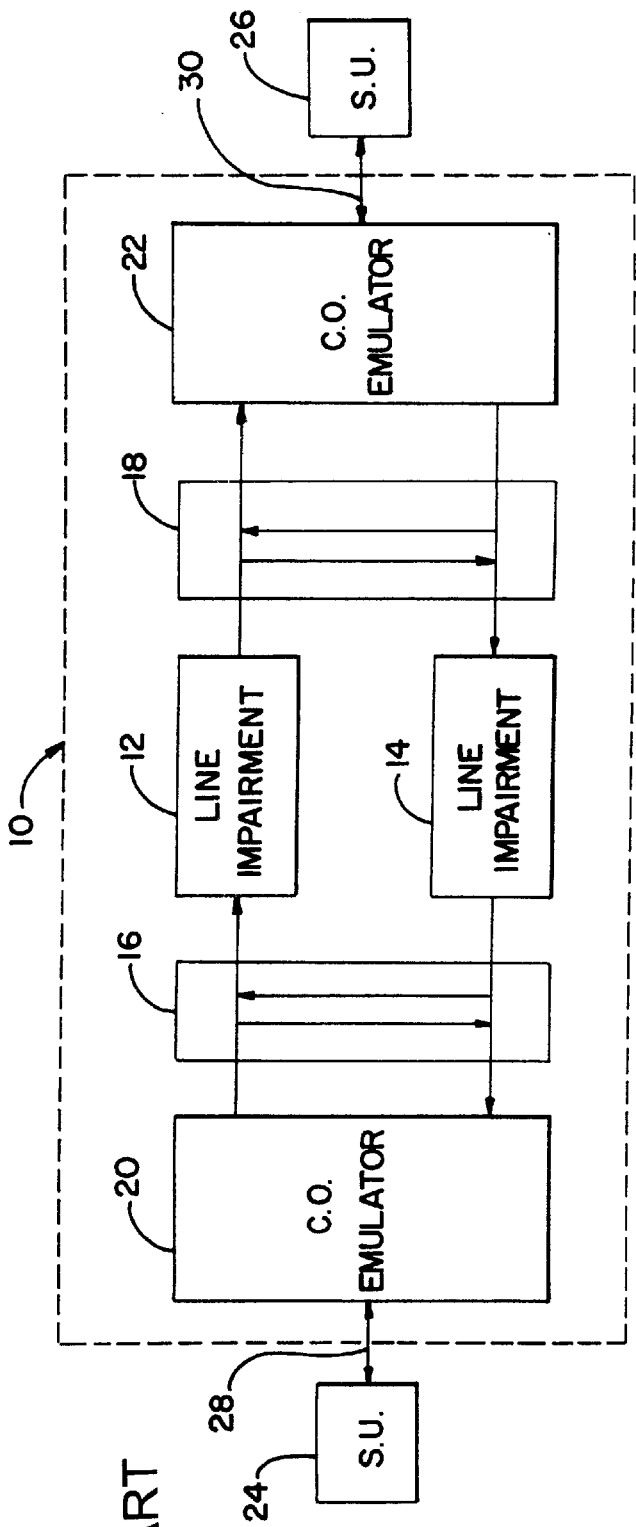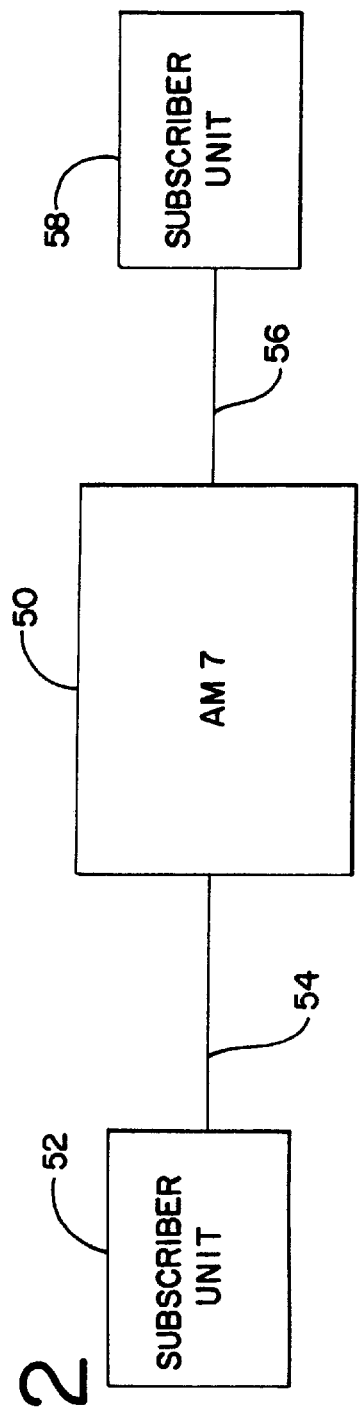
FIG. 1 PRIOR ART
FIG. 2 PRIOR ART

LINE PERFORMANCE TEST SYSTEM

This application claims the benefit of the filing date of Provisional Application Ser. No. 60/036,634, filed Jan. 31, 1997, by Daniel J. Schwartz.

BACKGROUND OF THE INVENTION

The present invention relates generally to telecommunication test equipment used to simulate telephone networks in a laboratory setting and more particularly to a device for providing an interface to enable two central office simulators to be used concurrently in a series or cascade topology to perform testing procedures.

Traditional test equipment provides an analog subscriber line interface for connection to a handset, modem, fax machine, data terminal, or other communication device capable of utilizing analog phone lines for transmission. In an analog telephone test system, each telephone or other communication device ("analog subscriber unit") is typically connected by a pair of wires ("tip" and "ring" wires or, cooperatively, "subscriber lines," "subscriber loop" or "phone lines") to the testing equipment in a manner similar to the subscriber connection in a standard telephone network. The test equipment provides the required functionality such as on-hook/off-hook detection, DTMP or pulse dial signal interpretation, supervisory signal generation (e.g., ring, ringback, busy, and dial tone), etc., and other control functions that may be necessary for call initiation, progression, and termination. The test equipment also provides simulation of various signal impairments and characteristics of a telephone transmission system and/or a telephone company central office ("central office" or "CO") and/or a CO-to-CO communication link.

Test equipment devices for use in telephone transmission system simulation may provide an end-to-end link for connecting two analog subscriber units, thereby enabling the two analog subscriber units to establish a communication link. One or both of the subscriber units may be units undergoing testing, or alternatively, one may be a reference subscriber unit. Typically, test equipment devices that simulate network impairments have the capability to mimic analog and/or digital sources of distortion commonly found in telephone network environments such as: signal echoes, additive noise, gain distortion, delay distortion, frequency shift, phase jitter, PCM coding distortion, PCM bit robbing, and the like.

One impairment simulator device presently available is the TAS 100 Series Telephone Network Emulator 10 (hereinafter referred to as a "TAS") depicted in FIG. 1, available from Telecom Analysis Systems, Inc., of Eatontown N.J. The TAS 100 Series test units have impairment generators 12 and 14 and echo generators 16 and 18 placed between two central office emulators 20 and 22 for providing connectivity between two analog subscriber units 24 and 26 over analog subscriber lines 28 and 30. The TAS also provides a digital interface bus (GPIB or RS-232) (not shown) for connection to a computer for remote control operation. The actual control is implemented through a Gemini test unit which receives commands from a personal computer and conveys the necessary control information to the TAS unit. The computer can be used to automatically configure the TAS in a number of different ways to emulate various line conditions. For a complete description of the features associated with the TAS 100 series products, see the 100 Series Telephone Network Emulator Operations Manual, Part Number 2700-3015, Version 2.11 (1995), which is hereby incorporated by reference.

Because most modem telephone systems are digital, and route digital information from CO to CO, there are test units that provide a digital interface, such as a T1 connection, on one side of the simulated communication link and a standard analog interface on the other side of the simulated communication link for connection to an analog subscriber unit. One such device is an Ameritec AM7 C.O. Simulator (hereinafter referred to as an "AM7"), available from Ameritec Corporation, located in Covina, Calif. The AM7 can serve as a central office, toll office, equal access switch, tandem switch, etc. The AM7 can provide 1.544 Megabit PCM and 2.048 Megabit PCM port cards, and each 1.544 Megabit port card provides access to twenty four channels associated with a T1 "span." The AM7 also provides 2-wire analog loop start or ground start interfaces. For a complete description of the features associated with the AM7, see the Ameritec AM7 C.O. Simulator User's Manual, part number 18-0014 (Mar. 6, 1991), which is incorporated herein by reference.

Subscriber units may also be digital in nature and have a digital interface to the phone system. Although digital subscriber units may ultimately provide an analog output such as audio or video signals, their interconnection to the communication network is generally of a digital nature by way of a DS0, DS1, T1, E1, ISDN, etc. (hereafter, the term "subscriber unit" is used to refer collectively to analog and digital subscriber units). Typical digital subscriber units include ISDN modems, devices interconnected to a Digital Data System (by way of, e.g., a Digital Data Port) and hub servers having direct digital access to the telephone network of the type disclosed in U.S. Pat. No. 5,528,595 to Walsh, et al., entitled "Modem Input/Output Signal Processing Techniques," and U.S. Pat. No. 5,577,105 to Baum et al., entitled "Telephone Call Switching and Routing Techniques for Data Communication." The contents of the above-named patents are incorporated herein by reference.

Simulated communication links suitable for testing of digital subscriber units may also be configured using test equipment of the type described above. Specifically, the AM7 provides a T1 interface that may be configured for connection to a digital subscriber unit. The AM7 also provides a central-office type analog subscriber line interface for connection of an analog subscriber unit. Thus, the AM7 can provide a simulated communication link between an analog subscriber unit and a digital subscriber unit. A block diagram of a simulated communication link using an AM7 50 is shown in FIG. 2. A digital subscriber unit 52 is connected to an AM7 50 by way of T1 line 54. The AM7 50 provides an analog loop circuit 56 for connecting an analog subscriber unit 58.

In certain circumstances it may be desirable to simulate a communication link between a digital subscriber unit and an analog subscriber unit. In such a situation it is desirable to cascade the two types of test equipment described above. Specifically, it may be desirable to have a T1 interface by way of an AM7 to an analog line impairment system by way of a TAS that also provides connection to an analog subscriber unit. This would allow a unit designed to have T1 access to a telephone network to be tested with a remote analog subscriber unit. Neither the TAS device nor the AM7 alone is satisfies all of the testing and interface requirements.

In a manner similar to a standard telephone network, the test equipment described above provides DC power, or "talk battery" power, on the analog lines (tip and ring lines) to enable operation of circuitry within the subscriber units connected to those lines. As part of the central office simulation functionality the test equipment also provides a ring voltage signal to the analog subscriber unit to indicate to the subscriber unit that a call is incoming. Typically, the talking battery is approximately 48 volts across the tip and ring when the subscriber unit is on-hook. The analog subscriber unit provides an open circuit (or a high impedance, such as 10 K ohms, when in the on-hook condition. In a "loop start" circuit, the analog subscriber unit generates an off-hook condition by providing a termination of approximately 600–900 ohms, i.e., by closing, or "looping" the tip and ring to form a complete electrical circuit.

One disadvantage associated with the above described test equipment is that neither provides a means of serially connecting the test equipment devices. That is, the only interfaces available for interconnection are analog subscriber-type interfaces similar to those provided by a central office. The analog interfaces 56, 28, and 30 of both pieces of test equipment are designed to provide the loop current and voltage to an analog subscriber unit, rather than for serial analog interconnection to another test unit. A direct interconnection would therefore be unlikely to function properly and damage to the test equipment may occur if the analog subscriber lines are directly connected.

The loop circuits of the test equipment devices may be interconnected by way of a transformer to provide DC isolation of the respective analog loop circuits. However, even if the test equipment devices were connected in a serial fashion by way of a transformer, there is no mechanism provided by which the supervisory signaling can be passed from one test unit through an intermediate test unit to a subscriber unit and vice versa. Of particular concern is the conveyance of an on-hook/off-hook indication from an analog subscriber unit. The test equipment directly connected to the analog subscriber unit will be able to detect the loop status (on-hook/off-hook status), however, the loop status cannot be passed to the second, serially connected test equipment. A manual switch configured to be normally open—indicating an on-hook condition—may be included in one or both of the interconnected loop circuits to allow a user to intervene by closing the switch thereby providing an off-hook indication to one or both of the test equipment devices. When the user determines that one unit is initiating a call (such as by detecting an audible ringback signal from the calling subscriber unit), the user may make the necessary connections to complete the circuit. A similar disadvantage is the propagation of a ring signal to the analog subscriber unit. A central office is not designed to receive or propagate a high voltage ring signal.

One disadvantage with this solution is the necessity of manual user intervention. This is a particular disadvantage in testing procedures that are automated by using a computer to remotely control the particular line impairments or other parameters of the test configuration which requires repeated call initiation and termination over a significant time frame. A further disadvantage is that the user may not be able to determine if a call has in fact been initiated. This is particularly difficult if the digital subscriber unit initiates the call because there might not be an audible ringback signal present to indicate call initiation.

It would therefore be desirable to have an improved line performance test system.

SUMMARY OF THE INVENTION

The present invention provides an apparatus for interconnecting the analog subscriber loops of two devices, such as central office equipment and/or central office emulators.

An object of the present invention is to provide an apparatus that is capable of switching a second central office emulator into a series connection between a first central office emulator and a subscriber unit.

Another object of the present invention is to provide a controller circuit for automatically performing the above-described switching.

Another object of the present invention is to provide an off-hook detector circuit for providing the control circuit with an indication of the off-hook status of an analog subscriber unit.

A still further object of the present invention is to provide a solution to the disadvantages associated with the test equipment described in the Background of the Invention.

BRIEF DESCRIPTION OF THE DRAWINGS

The foregoing and other objects, features and advantages of the present invention will be more readily appreciated upon reference to the following disclosure when considered in conjunction with the accompanying drawings, in which:

FIG. 1 depicts a block diagram of a TAS Emulator;

FIG. 2 shows a block diagram of an AM7 C.O. Simulator in a test configuration;

DETAILED DESCRIPTION OF THE PREFERRED EMBODIMENT

Figure 3:
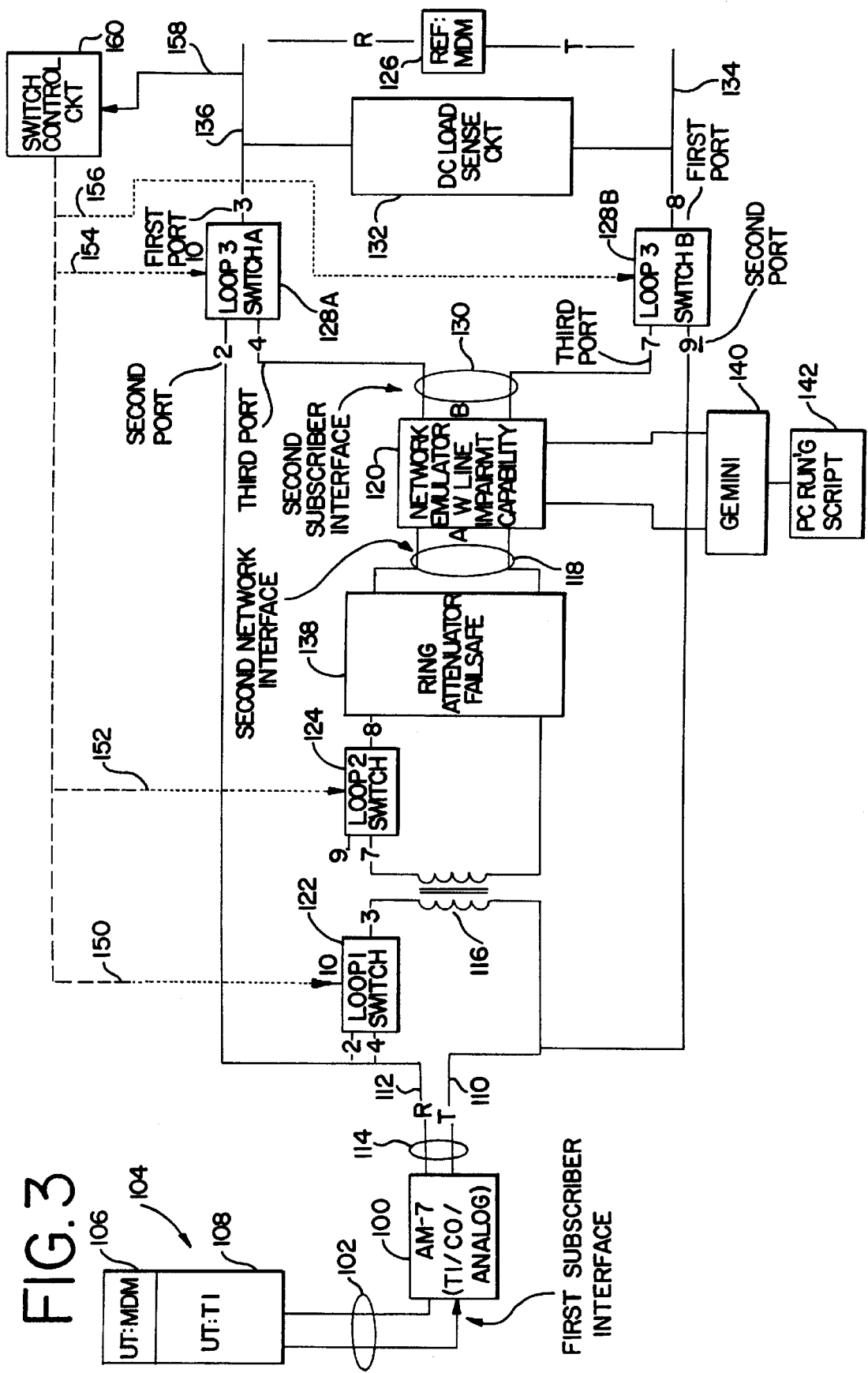
FIG. 3 shows a diagram of a preferred embodiment of the automatic switching device.

A block diagram of a preferred embodiment of the line performance test apparatus is shown in FIG. 3. Generally speaking, the overall function of the circuit is to selectively place a central office emulator such as the TAS unit 120 into serial connection between another central office emulator such as the AM7 device 100 and the analog subscriber unit 126. The AM7 test device 100 is connected to a digital subscriber unit 104 having a T1 interface portion 108 and a modem and/or router portion 106 interconnected via T1 connection 102. The subscriber unit 104 may be a unit under test (UT), or the analog subscriber unit 126 may be a UT, or both devices 104 and 126 may be UT's.

The tip line 110 and ring line 112 make up the analog subscriber loop 114 of the AM7 device 100. The AM7 subscriber loop 114 has two alternative connections. The first is through transformer 116, which provides AC coupling to the "A" analog subscriber loop 118 of the TAS unit 120. Note that loop switch one 122 and loop switch two 124 provide a means of opening and/or closing the subscriber loops 114 and 118, respectively. The second connection is to analog subscriber unit 126 by way of loop switch three 128A and 128B. The analog subscriber unit 126 may alternatively be connected to the TAS 120 "B" analog subscriber loop 130 by way of loop switch 3 128A and 128B. Off-hook detection circuit 132 is also connected to the tip 134 and ring 136 lines of the analog subscriber unit 126. Ring attenuator circuit 138 is provided as an optional protection circuit in case a high voltage ring signal generated by the AM7 100 is accidentally provided through switches 122 and 124 to the TAS analog subscriber loop 118. In practice it has been found that attenuator 138 may be omitted without introducing significant risk of damage to the TAS subscriber loop 118 driver circuitry. FIG. 3 also shows the Gemini unit 140 that forwards the configuration information from the personal computer 142 to the TAS unit 120. The Gemini unit also is connected to the subscriber units at both ends of the simulated communication link to compare the data, calculate the error rates, and to command the subscriber units to initiate a call. The personal computer may be used for running a script that varies the configuration of the TAS unit 120 automatically. The control circuit 160 receives input 158 from the off-hook detector 132. Input 158 is preferably an opto-coupler. The control circuit 160 provides outputs on lines 150, 152, 154, and 156 to control loop switches 122, 124, 128A, and 128B, respectively.

Figure 4:
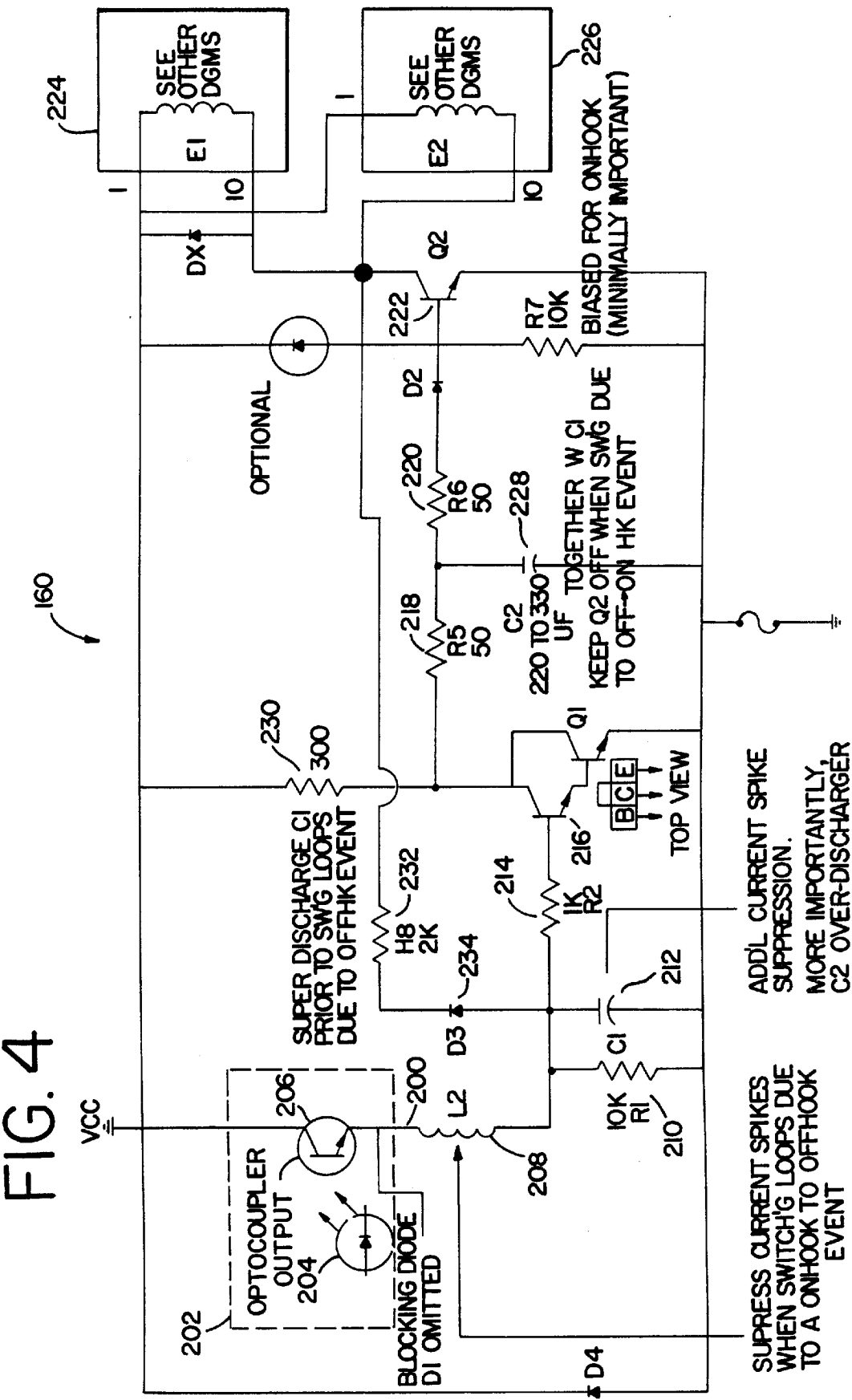
FIG. 4 shows a schematic diagram of a preferred embodiment of the switching control circuit.

The control circuit 160 is depicted in FIG. 4. The control circuit receives input 158 on line 200 from opto-coupler 202 (consisting of light emitting diode 204 and light activated transistor 206). When analog subscriber unit 126 is on-hook, transistor 206 is in the on state, thereby providing a high voltage (near Vcc) to the base of Darlington transistor pair 216 by way of inductor 208, resistor 210, capacitor 212 and resistor 214. The high voltage on the base of transistor 216 causes it to conduct, thereby providing a low voltage to the base of transistor 222 thereby putting transistor 222 in a non-conductive state. The relays 224 and 226 are therefore in a de-energized state (note that only the activation coil of the relays are shown in FIG. 4). Relay 224 corresponds to loop switch three A 128A and loop switch three B 128B, which are preferably an integral relay providing simultaneous switching of the tip 134 and ring 136 contacts between either the analog loop 130 or analog loop 114. The relay is preferably a break-before-make relay. Relay 226 corresponds to loop one switch 122 and loop two switch 124 that is preferably a single relay capable of making or breaking the two connections simultaneously.

When the analog subscriber unit 126 creates an off-hook condition, current no longer flows through diode 204, and transistor 206 stops conducting. Capacitor 212 discharges through resistor 210, thereby keeping transistor 216 in the conductive state for a short period after the subscriber unit has gone off-hook. Once capacitor 212 discharges sufficiently to allow transistor 216 to turn off, capacitor 228 is charged through resistors 230 and 218. When capacitor 228 has charged sufficiently, transistor 222 is biased to begin conducting, thereby energizing relays 224 and 226. Capacitor 212 then rapidly discharges its remaining charge through resistor 232, diode 234 and transistor 222.

The energized relays 224 and 226 cause the TAS unit 120 to be inserted in the circuit path between the AM7 and the analog subscriber unit 126. A current or voltage spike may occur across tip 134 and ring 136 when the connection is made to analog subscriber loop 130. This spike may cause diode 204 to conduct for the duration of the spike, giving a false indication of an on-hook condition. Consequently, inductor 208 and capacitor 212 are provided to prevent the generation of a false on-hook signal. Transistor 206 must be activated for a sufficiently long time so as to charge capacitor 212 through inductor 208 before transistor 216 is made to conduct. Additionally, capacitor 228 would have to discharge through resistor 228 and transistor 216 before transistor 222 would accidentally cease conducting. Thus the delays associated with the charging of capacitor 212 and discharging of capacitor 228 provide protection against the possibility of current or voltage spikes generating a false on-hook signal.

Thus, whether the analog subscriber unit is connected to the AM7 subscriber loop until an off-hook condition is generated, at which time the off-hook detector 132 in combination with the control circuit 160, connects the subscriber unit 126 to the subscriber loop 130, and the analog subscriber loop 114 to subscriber loop 118. The analog subscriber unit 126 may generate an off-hook condition for the purpose of initiating a call or answering an incoming call.

At the end of the call the analog subscriber unit 126 generates an on-hook condition. Detector 132 causing diode 204 to conduct detects the on-hook condition. Transistor 206 begins conducting and capacitor 212 begins to charge. Eventually, transistor 216 turns on, which causes capacitor 228 to discharge through resistor 218 and transistor 216. Then transistor 222 is turned off, thereby de-energizing the relays 224 and 226. Note that if the switching causes a momentary false off-hook condition resulting in transistor 206 turning off, the discharging of capacitor 212 and the charging of capacitor 228 provides a long enough delay to prevent transistor 222 from accidentally turning back on and re-energizing the relays 224 and 226. In this manner, a false off-hook signal is prevented.

In the preferred embodiment, the TAS unit 120 is configured to operate in leased line mode. The signal path is therefore always present between analog subscriber loops 118 and 130. This obviates the need for any dialing information to be sent to the TAS unit 120, or any call progress tones to be generated by the TAS unit 120. Rather, when the analog subscriber unit 126 initiates a call by going off-hook, the TAS unit 120 is immediately switched into serial connection between the AM7 and analog subscriber unit 126. From that point forward, the call progress tones such as dial tone, DTMF signaling, ringback, busy tone, and the like, are all passed directly through the TAS as regular analog signals. Thus, the analog subscriber unit is fully capable of initiating a call. Similarly, when the digital subscriber unit 104 initiates a call by setting the appropriate signaling bits in the T1 frame, the loop switches are configured to direct the high-voltage ring signal generated by the AM7 to the analog subscriber unit (the subscriber unit is assumed to have been set to an on-hook condition via the computer 142 and Gemini control unit 140).

Figure 5:
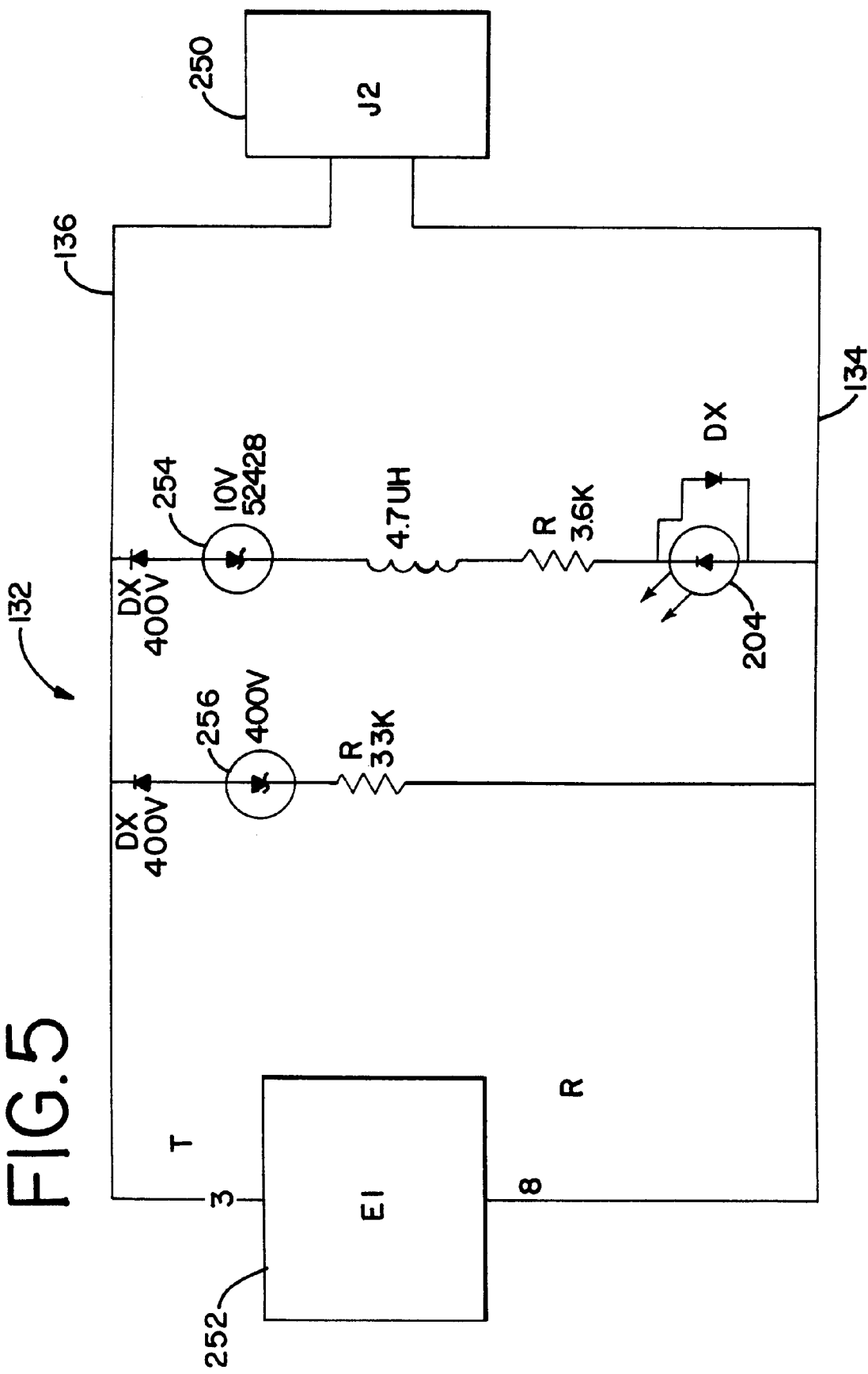
FIG. 5 shows a schematic diagram of the off-hook detector.

The off-hook detector is depicted in FIG. 5. Two connectors 250 and 252 are provided for ease of connection to an analog subscriber unit 126 and the loop switch three 128A, 128B. The detector 132 provides optical isolation between the DC circuit of the tip and ring 134, 136, and the switch control circuit 160. When the analog subscriber unit 126 is on hook, it is connected by way of loop switch three 128A, 128B to the subscriber loop 114 of AM7 device 100. The analog subscriber unit 126 provides relatively high impedance to the subscriber loop 114. The voltage across the tip and ring 134, 136 causes the zener diode 254 to conduct. The current flow through diode 204 provides an on-hook indication to the switch control circuit 160. When the analog subscriber unit generates an off-hook condition, it provides relatively low impedance to the subscriber loop 114. The voltage across the tip and ring typically falls to a level insufficient to reverse bias the zener diode 254, thus blocking the current flow though diode 204, thereby providing an off-hook indication to the switch control circuit 160. Zener diode 256 is provided as a shunt current path to protect the opto-isolation diode 204 in the event of a high voltage ring signal.

The circuitry and functionality of the present invention may be incorporated into a central office simulator. Specifically, a central office simulator having the line impairment functionality of a TAS and the additional interconnection apparatus shown in FIG. 3 may be incorporated in a single unit.

The detailed description of the preferred embodiment is intended as an illustration, and not as a limitation, of the present invention. Thus, while variations and modifications of the invention will occur to those skilled in the art, it is to be understood that such modifications are within the scope of the invention.

We claim:

1. A subscriber test system for providing a data channel between a first and second subscriber unit comprising:
    a first line test device having a first subscriber interface adapted for connecting to a first subscriber unit, and having a first network interface;
    a second line test device having a second subscriber interface and a second network interface;
    a detection circuit for determining whether the second subscriber unit is on-hook;
    a switching circuit having first port adapted for connecting to a second subscriber unit, a second port connected to said first network interface, and a third port connected to said second subscriber interface;
    wherein said switching circuit is responsive to said detection circuit for connecting said first port to said second port when the second subscriber unit is on hook, and, when the second subscriber unit is not on-hook, for connecting said first port to said third port and said first network interface to said second network interface.

2. The subscriber test system of claim 1 wherein said second line test unit provides a continual data channel between said first subscriber interface and said first network interface.

3. The subscriber test system of claim 1 wherein said detection circuit further comprises a DC load sense circuit.

4. The subscriber test system of claim 1 wherein said first and second network interfaces are two-wire interfaces, and wherein said switching circuit further comprises a first switch and a first transformer winding connected in series across said first two-wire network interface, and a second switch and a second transformer winding connected in series across said second two-wire network interface, wherein said first and second switches selectively couple said first two-wire network interface to said second two-wire network interface via said first and second transformer windings.

5. The subscriber test system of claim 1 wherein said detection circuit is coupled to the second subscriber unit via a light emitting diode and optical transistor.

6. The subscriber test system of claim 1 wherein said detection circuit further includes a current spike suppression circuit.

7. The subscriber test system of claim 1 wherein said first subscriber interface is a digital interface.

8. The subscriber test system of claim 1 further comprising a ring attenuator failsafe circuit for preventing ring voltages generated at said first network interface from being applied to said second network interface.

9. The subscriber test system of claim 1 wherein said first, second, and third ports are two-wire ports.

10. A method of configuring telecommunication test equipment comprising the steps of:
    providing a first line test device connected to a first subscriber unit;
    providing a second line test device;
    providing a second subscriber unit;
    detecting the on-hook status of the second subscriber unit;
    selectively connecting the second line test device between the first line test device and the second subscriber unit in response to the on-hook status.

11. The method of claim 10 wherein the connection between the first line test device and the first subscriber unit is a digital connection.

12. The method of claim 10 wherein the detecting step comprises the step of sensing the voltage across the second subscriber unit.

* * * * *